United States Patent
Lim et al.

(10) Patent No.: US 10,985,590 B2
(45) Date of Patent: Apr. 20, 2021

(54) METHOD AND APPARATUS FOR CHARGING BATTERY

(71) Applicant: SAMSUNG ELECTRONICS CO., LTD., Suwon-si (KR)

(72) Inventors: Ju Wan Lim, Suwon-si (KR); Jin Duk Oh, Seoul (KR); Myunghoon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 598 days.

(21) Appl. No.: 15/782,452

(22) Filed: Oct. 12, 2017

(65) Prior Publication Data

US 2018/0123354 A1 May 3, 2018

(30) Foreign Application Priority Data

Nov. 1, 2016 (KR) .................. 10-2016-0144227
Jul. 27, 2017 (KR) .................. 10-2017-0095510

(51) Int. Cl.
*H02J 7/00* (2006.01)
*H01M 10/42* (2006.01)
*H01M 10/44* (2006.01)
*H01M 10/46* (2006.01)
*H02J 7/02* (2016.01)

(52) U.S. Cl.
CPC .......... *H02J 7/008* (2013.01); *H01M 10/425* (2013.01); *H01M 10/44* (2013.01); *H01M 10/46* (2013.01); *H02J 7/0071* (2020.01); *H02J 7/00718* (2020.01); *H02J 7/007184* (2020.01); *H02J 7/022* (2013.01)

(58) Field of Classification Search
CPC ....... Y02E 60/12; H02J 7/0042; H02J 7/0045; H01M 10/46; H01M 10/44
See application file for complete search history.

(56) References Cited

U.S. PATENT DOCUMENTS

| 8,624,560 B2 | 1/2014 | Ungar et al. |
| 2003/0228519 A1 | 12/2003 | Nakura et al. |
| 2008/0191667 A1* | 8/2008 | Kernahan ............. H01M 10/44 320/150 |
| 2011/0156661 A1 | 6/2011 | Mehta et al. |
| 2011/0199055 A1* | 8/2011 | Burchardt ............... H02J 7/007 320/148 |
| 2013/0009604 A1 | 1/2013 | Bhardwaj et al. |

(Continued)

FOREIGN PATENT DOCUMENTS

| JP | 2011-155799 A | 8/2011 |
| JP | 2012-19679 A | 1/2012 |

(Continued)

OTHER PUBLICATIONS

European Search Report dated Feb. 13, 2018, in corresponding European Application No. 17198957.7 (7 pages, in English).

*Primary Examiner* — Arun C Williams
(74) *Attorney, Agent, or Firm* — NSIP Law

(57) ABSTRACT

A battery charging method includes: charging a battery with a charging current; and changing the charging current in response to a current change event occurring during the charging of the battery, wherein the current change event occurs when the battery reaches a threshold voltage at which an anode potential of the battery reaches a reference value.

25 Claims, 14 Drawing Sheets

(56) References Cited

U.S. PATENT DOCUMENTS

| | | | |
|---|---|---|---|
| 2013/0300346 A1* | 11/2013 | Ishibashi | H02J 7/0068 320/107 |
| 2013/0314053 A1 | 11/2013 | Iwasaki | |
| 2015/0088253 A1 | 3/2015 | Doll et al. | |
| 2017/0371000 A1* | 12/2017 | Fukushima | G01R 31/382 |

FOREIGN PATENT DOCUMENTS

| JP | 5223920 B2 | 6/2013 |
|---|---|---|
| KR | 10-2010-0075913 A | 7/2010 |
| KR | 10-2012-0028350 A | 3/2012 |

\* cited by examiner

FIG. 1
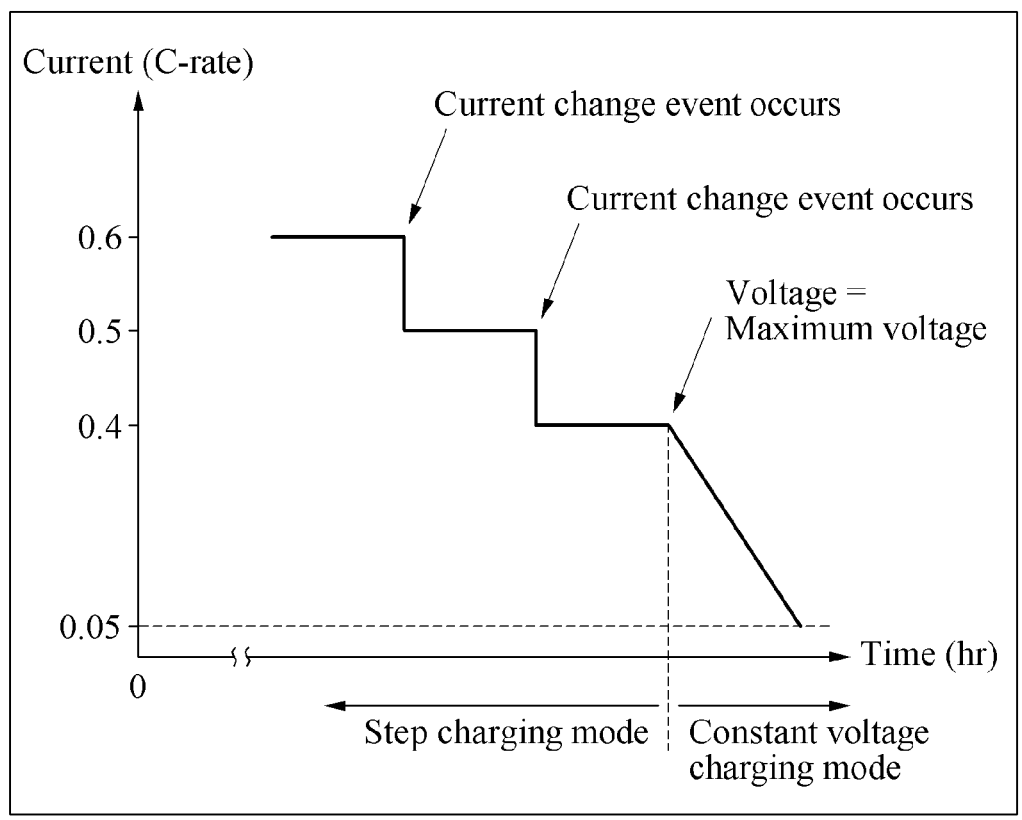
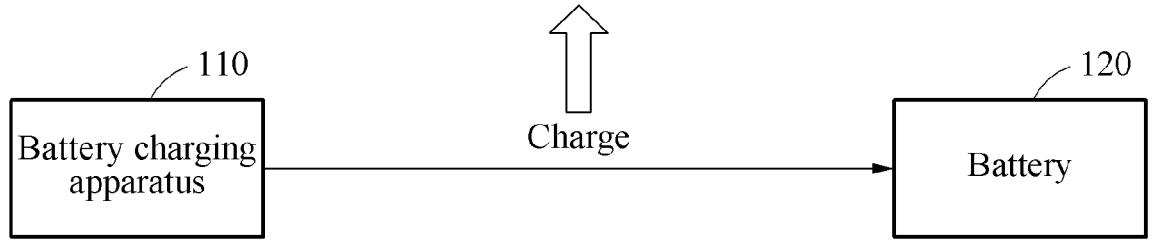

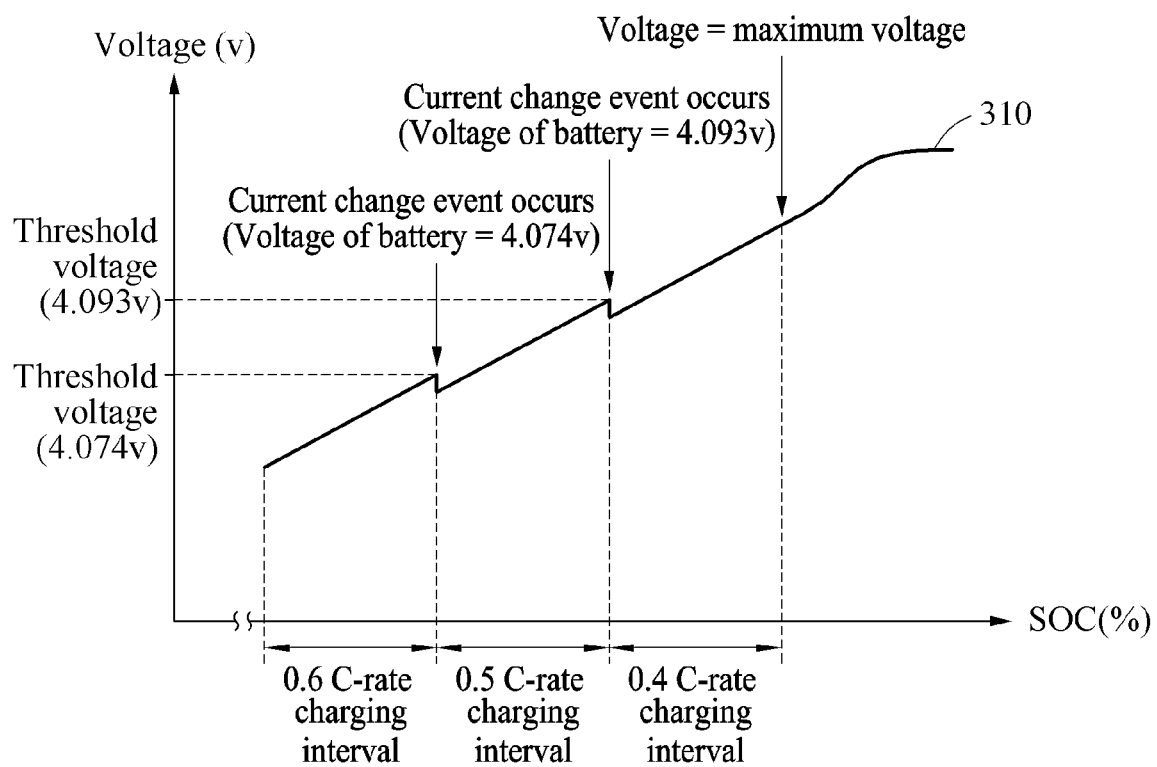

FIG. 4A

SOH = 0.95

| Charging current | Threshold voltage |
|---|---|
| ⋮ | ⋮ |

410

SOH = 0.9

| Charging current | Threshold voltage |
|---|---|
| ⋮ | ⋮ |

420

SOH = 0.85

| Charging current | Threshold voltage |
|---|---|
| ⋮ | ⋮ |

Battery type = a

| Charging current | Threshold voltage |
|---|---|
| ⋮ | ⋮ |

440

Battery type = b

| Charging current | Threshold voltage |
|---|---|
| ⋮ | ⋮ |

450

Battery type = c

| Charging current | Threshold voltage |
|---|---|
| ⋮ | ⋮ |

460

...

METHOD AND APPARATUS FOR CHARGING BATTERY

CROSS-REFERENCE TO RELATED APPLICATIONS

This application claims the benefit under 35 USC 119(a) of Korean Patent Application Nos. 10-2016-0144227 and 10-2017-0095510 filed on Nov. 1, 2016 and Jul. 27, 2017, respectively, in the Korean Intellectual Property Office, the entire disclosures of which are incorporated herein by reference for all purposes.

BACKGROUND

1. Field

The following description relates to a battery charging method and apparatus.

2. Description of Related Art

Various methods are used to charge a battery. For example, a constant current-constant voltage (CCCV) based charging method is used to charge a battery with a constant current, and to charge the battery with a constant voltage when a voltage of the battery reaches a preset voltage. For another example, a varying current decay (VCD) based charging method is used to charge a battery with a high current in a low state of charge (SOC), and to charge the battery by gradually decreasing the current when the SOC becomes a specific SOC.

For still another example, a fast charging method is used to reduce an amount of time used to charge a battery. In such an example, repetitions of fast charging may degrade a life of the battery.

SUMMARY

This Summary is provided to introduce a selection of concepts in a simplified form that are further described below in the Detailed Description. This Summary is not intended to identify key features or essential features of the claimed subject matter, nor is this Summary intended to be used as an aid in determining the scope of the claimed subject matter.

In one general aspect, a battery charging method includes: charging a battery with a charging current; and changing the charging current in response to a current change event occurring during the charging of the battery, wherein the current change event occurs when the battery reaches a threshold voltage at which an anode potential of the battery reaches a reference value.

The battery charging method may further include: verifying the threshold voltage corresponding to the charging current by referring to a table in which the threshold voltage and the charging current are stored.

The battery charging method may further include: in response to life information of the battery changing, replacing the table with a table corresponding to the changed life information.

The battery charging method may further include: terminating a charging interval corresponding to the charging current, in response to the current change event occurring; and charging the battery with a current that is less than the charging current in a subsequent charging interval.

The battery charging method may further include: charging the battery with a constant voltage, in response to the battery reaching a maximum voltage; and terminating the charging of the battery, in response to the charging current decreasing to a termination current during the charging of the battery with the constant voltage.

The reference value may be 0.075 volts (V) to 0.73 V.

The reference value may be 0.075 V to 0.2 V.

A non-transitory computer-readable storage medium may store instructions that, when executed by a processor, cause the processor to perform the method.

In another general aspect, a battery charging apparatus includes: a controller configured to charge a battery with a charging current, and configured to change the charging current in response to a current change event occurring during the charging of the battery, wherein the current change event occurs when the battery reaches a threshold voltage at which an anode potential of the battery reaches a reference value.

The controller may be further configured to verify the threshold voltage corresponding to the charging current by referring to a table in which the threshold voltage and the charging current are stored.

The controller may be configured to replace the table, in response to life information of the battery changing, with a table corresponding to the changed life information.

The controller may be configured to terminate a charging interval corresponding to the charging current and to charge the battery with a current that is less than the charging current in a subsequent charging interval, in response to the current change event occurring.

The controller may be configured to charge the battery with a constant voltage in response to the battery reaching a maximum voltage, and to terminate the charging of the battery in response to the charging current decreasing to a termination current during the charging of the battery with the constant voltage.

The reference value may be 0.075 volts (V) to 0.73 V.

The reference value may be 0.075 V to 0.2 V.

In another general aspect, a battery charging method includes: charging a battery with a first charging current; and charging the battery with a second charging current that is less than the first charging current, in response to the battery reaching a threshold voltage at which an anode potential of the battery reaches a reference value.

The reference value may be 0.075 volts (V) to 0.73 V.

The reference value may be 0.075 V to 0.2 V.

The first charging current may be greater than or equal to 1.0 C-rate.

The battery charging method may further include: verifying the threshold voltage corresponding to the first charging current by referring to a table in which the threshold voltage and the first charging current are stored.

The battery charging method may further include: in response to life information of the battery changing, replacing the table with a table corresponding to the changed life information.

The battery charging method may further include: charging the battery with a constant voltage, in response to the battery reaching a maximum voltage; and terminating the charging of the battery, in response to a charging current decreasing to a termination current during the charging of the battery with the constant voltage.

In another general aspect, a battery system includes: a battery; and a controller configured to charge the battery, in a first charging mode, with an initial charging current among charging currents stored in a memory, and in the first charging mode, change the initial charging current to a subsequent charging current, among the charging currents, in response to a voltage of the battery reaching a threshold voltage stored in the memory as corresponding to the initial charging current. The threshold voltage is a voltage at which an anode potential of the battery reaches a reference value.

The controller may be further configured to terminate the charging of the battery in the first charging mode and to charge the battery with a constant voltage in a second charging mode, in response to the voltage of the battery reaching a maximum voltage.

The controller may be further configured to terminate the charging of the battery in the second charging mode, in response to a charging current in the second charging mode decreasing to a termination current.

Other features and aspects will be apparent from the following detailed description, the drawings, and the claims.

BRIEF DESCRIPTION OF THE DRAWINGS

FIG. 1 is a diagram illustrating an example of a battery system.

FIGS. 2 and 3 are diagrams illustrating an example of a battery charging method.

FIGS. 4A and 4B are diagrams illustrating another example of a battery charging method.

Figure 2:
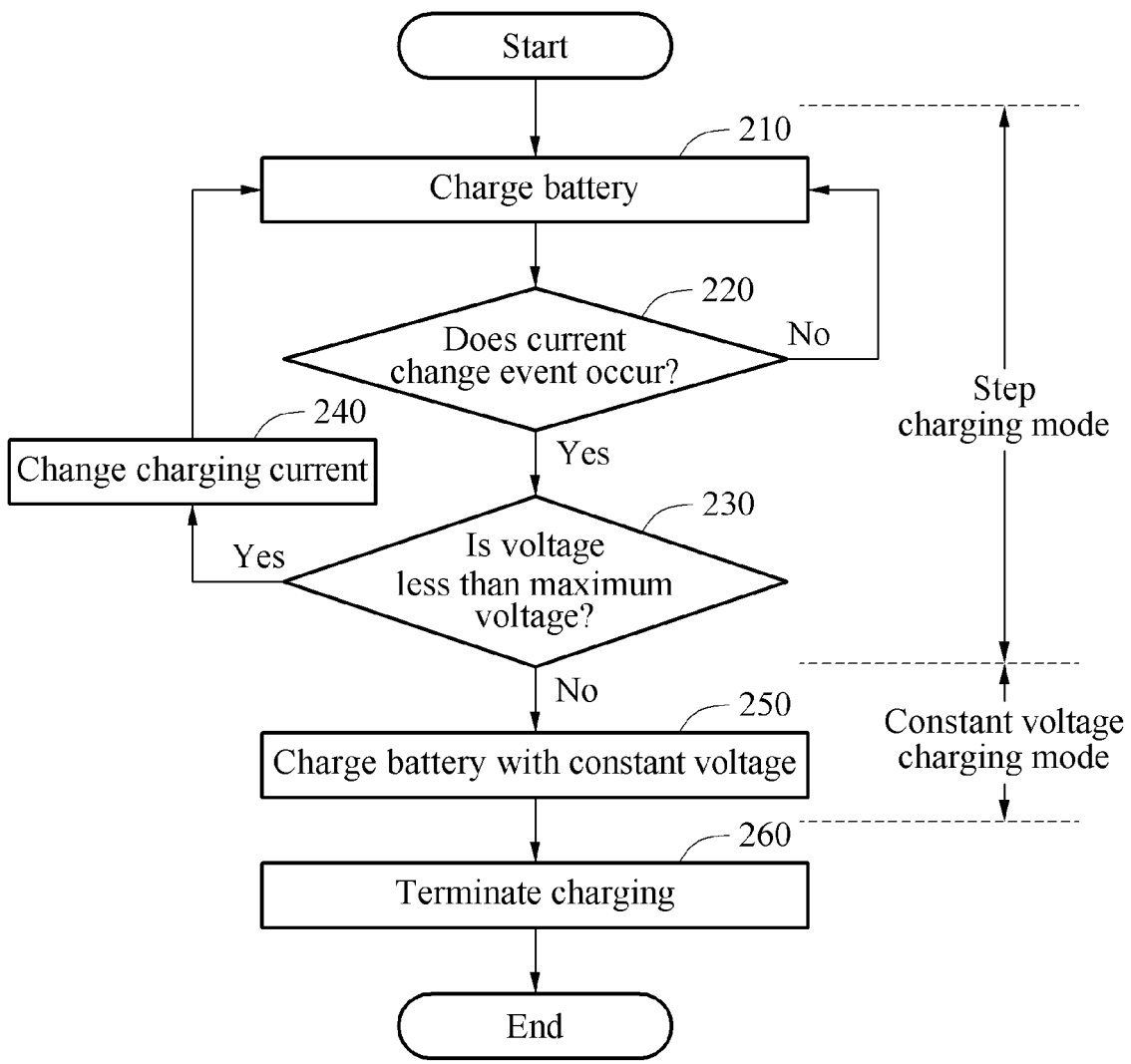

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," "third," "A," "B," "(a)," and "(b)" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a diagram illustrating an example of a battery system 100.

Referring to FIG. 1, the battery system 100 includes a battery charging apparatus 110 and a battery 120. The battery 120 is a battery cell, a battery module, or a battery pack.

The battery charging apparatus 110 charges the battery 120 in a step charging mode. The step charging mode refers to a type of a fast charging mode, in which the battery charging apparatus 110 charges the battery 120 by changing a charging current stepwise.

When the battery 120 is charged, an anode potential of the battery 120 may be lowered due to an electrochemical phenomenon occurring in the battery 120. When the battery 120 is being continuously charged at a low anode potential, for example, less than or equal to 0 volts (V), an electrode of the battery 120 may be plated with metal. For example, in a case of a lithium-ion battery, lithium plating occurs to form metallic lithium around an anode of the lithium-ion battery. Such a plating may reduce a life of the battery 120.

To prevent plating, the battery charging apparatus 110 charges the battery 120 by changing a charging current each time a current change event occurs in the step charging mode. For example, in response to a voltage of the battery 120 reaching a threshold voltage, the current change event may occur. In such a case, a voltage of the battery 120 obtained when the anode potential of the battery 120 reaches a reference value is set to be the threshold voltage. The reference value may be set to be a specific value or interval, and the threshold voltage is set to maintain the anode potential to be greater than or equal to the reference value while the battery 120 is being charged, and it is thus possible to prevent metal plating on an anode of the battery 120 and deterioration of the battery 120.

The battery charging apparatus 110 charges the battery 120 while reducing the charging current stepwise each time a voltage of the battery 120 reaches the threshold voltage. In response to the voltage of the battery 120 reaching a maximum voltage while the battery 120 is being charged in the step charging mode, the battery charging apparatus 110 charges the battery 120 in a constant voltage charging mode.

Hereinafter, an example of a battery charging method performed by the battery charging apparatus 110 will be described in detail with reference to FIGS. 2 and 3, and 4A and 4B.

FIGS. 2 and 3 are diagrams illustrating an example of a battery charging method.

Referring to FIG. 2, in operation 210, the battery charging apparatus 110 charges the battery 120 in a step charging mode. In this case, it is assumed that, when a step charging mode has charging currents, for example, 1.2 C-rate to 0.4 C-rate as illustrated in Table 1, the battery charging apparatus 110 charges the battery 120 with a charging current, for example, 1.2 C-rate, among the charging currents.

TABLE 1

| Charging current (C-rate) |
| --- |
| 1.2 |
| 1.1 |
| 1.0 |
| 0.9 |
| 0.8 |
| 0.7 |
| 0.6 |
| 0.5 |
| 0.4 |

In operation 220, the battery charging apparatus 110 monitors whether a current change event occurs to change the charging current. For example, the battery charging apparatus 110 monitors whether a voltage of the battery 120 reaches a threshold voltage corresponding to the charging current, for example, 1.2 C-rate. That is, the battery charging apparatus 110 compares the voltage of the battery 120 to the threshold voltage corresponding to the charging current, for example, 1.2 C-rate. The threshold voltage corresponding to 1.2 C-rate is a voltage of the battery 120 at which an anode potential of the battery 120 reaches a reference value. Thus, the battery charging apparatus 110 verifies the threshold voltage corresponding to 1.2 C-rate to be, for example, 3.974 V by referring to a table, for example, Table 2, in which charging currents and corresponding threshold voltages are recorded, and then monitors whether the voltage of the battery 120 reaches the threshold voltage 3.974 V.

TABLE 2

| Charging current (C-rate) | Threshold voltage (V) |
| --- | --- |
| 1.2 | 3.974 |
| 1.1 | 3.986 |
| 1.0 | 4.002 |
| 0.9 | 4.018 |
| 0.8 | 4.037 |
| 0.7 | 4.055 |
| 0.6 | 4.074 |
| 0.5 | 4.093 |
| 0.4 | 4.122 |

The reference value is set to prevent or minimize occurrence of metal plating on an anode of the battery 120. The reference value is set to be, for example, a value in a range of 0.075 V to 0.73 V or 0.07 V to 0.2 V. However, the reference value is not limited to the foregoing example values.

In response to the current change event not occurring in operation 220, for example, in response to the voltage of the battery 120 being less than the threshold voltage 3.974 V, the battery charging apparatus 110 continues charging the battery 120 with the charging current 1.2 C-rate.

In operation 230, in response to the current change event occurring in operation 220, for example, in response to the voltage of the battery 120 reaching the threshold voltage 3.974 V, the battery charging apparatus 110 verifies whether the voltage of the battery 120 is less than a maximum voltage. The maximum voltage is set to prevent overcharging of the battery 120, and may vary depending on a battery type. For example, a maximum voltage of a lithium-ion battery may be set within a range of 4 V to 4.2 V. In a case in which the verifying of whether the voltage of the battery 120 is less than the maximum voltage is not performed, the battery 120 may be overcharged and become abnormal, and thus a life of the battery 120 may be reduced. Accordingly, the battery charging apparatus 110 verifies whether the voltage of the battery 120 is less than the maximum voltage to prevent or minimize such an overcharging issue.

In operation 240, in response to the voltage of the battery 120 being less than the maximum voltage in operation 230, the battery charging apparatus 110 changes the charging current. For example, the battery charging apparatus 110 changes the charging current from 1.2 C-rate to 1.1 C-rate. That is, the battery charging apparatus 110 terminates a charging interval corresponding to 1.2 C-rate, and charges the battery 120 in a charging interval corresponding to 1.1 C-rate.

The battery charging apparatus 110 repeats operations 210 through 240 until the voltage of the battery 120 reaches the maximum voltage. When the battery charging apparatus 110 repetitively performs operations 210 through 240, a change in voltage of the battery 120 may occur as illustrated in a graph 310 of FIG. 3. Referring to FIG. 3, the battery charging apparatus 110 changes a charging current each time a current change event occurs until a voltage of the battery 120 reaches the maximum voltage.

In operation 250, in response to the voltage of the battery 120 reaching the maximum voltage in operation 230, the battery charging apparatus 110 charges the battery 120 with a constant voltage. That is, the battery charging apparatus 110 charges the battery 120 in a constant voltage charging mode. In this case, the charging current gradually decreases over time to a termination current, for example, of 0.05 C-rate. In operation 260, in response to the charging current reaching the termination current, the battery charging apparatus 110 terminates charging the battery 120.

According to an example, charging in the step charging mode is controlled based on a threshold voltage, and thus an anode potential of a battery is maintained to be greater than or equal to a reference value. Thus, occurrence of metal plating on an anode of the battery may be prevented, and a life of the battery may therefore be increased.

FIGS. 4A and 4B are diagrams illustrating another example of a battery charging method.

FIG. 4A illustrates tables 410, 420, and 430 corresponding to a state of health (SOH) of 0.95, an SOH of 0.9, and an SOH of 0.85, respectively. The SOH is also referred to as life information of a battery.

An anode potential of the battery 120 changes depending on a degree of deterioration of the battery 120. However, when the battery charging apparatus 110 continues charging the battery 120 using a single table, for example, Table 2 illustrated above, irrespective of the degree of deterioration of the battery 120, the anode potential may become less than a reference value. Thus, when the battery 120 deteriorates and an SOH of the battery 120 decreases accordingly, the battery charging apparatus 110 performs the battery charging method described with reference to FIG. 2 above by referring to a table corresponding to the decreased SOH. For example, referring to FIG. 4A, in a case in which the SOH of the battery 120 is 0.95, the battery charging apparatus 110 performs the battery charging method described with reference to FIG. 2 by referring to the table 410. In a case in which the SOH of the battery 120 is 0.9, the battery charging apparatus 110 performs the battery charging method described with reference to FIG. 2 by replacing the table 410 with the table 420. Similarly, in a case in which the SOH of the battery 120 is 0.85, the battery charging apparatus 110 performs the battery charging method described with reference to FIG. 2 by replacing the table 420 with the table 430.

FIG. 4B illustrates tables 440, 450, and 460 corresponding to a battery tape a, a battery type b, and a battery type c, respectively. In each of the tables 440, 450, and 460, charging currents for a corresponding battery type and threshold voltages corresponding to the charging currents are recorded.

The battery charging apparatus 110 selects a table from various tables based on a battery type, and performs the battery charging method described with reference to FIG. 2 based on the selected table. For example, the battery charging apparatus 110 selects a table from the tables 440, 450, and 460 based on a type of the battery 120. The battery charging apparatus 110 selects the table 440 in response to the type of the battery 120 being a, the table 450 in response to the type of the battery 120 being b, and the table 460 in response to the type of the battery 120 being c. The battery charging apparatus 120 then performs the battery charging method described with reference to FIG. 2 based on the selected table.

To perform the battery charging method described with reference to FIGS. 1 through 3, and 4A and 4B by the battery charging apparatus 110, a threshold voltage corresponding to each charging current in a step charging mode may need to be determined in advance. Hereinafter, example methods of determining a threshold voltage be described in detail with reference to FIGS. 5 through 10.

FIGS. 5 through 7, and 8A and 8B are diagrams illustrating an example of a method of determining a threshold voltage. The method of determining a threshold voltage to be described hereinafter may be performed by a threshold voltage determining apparatus.

Figure 5:
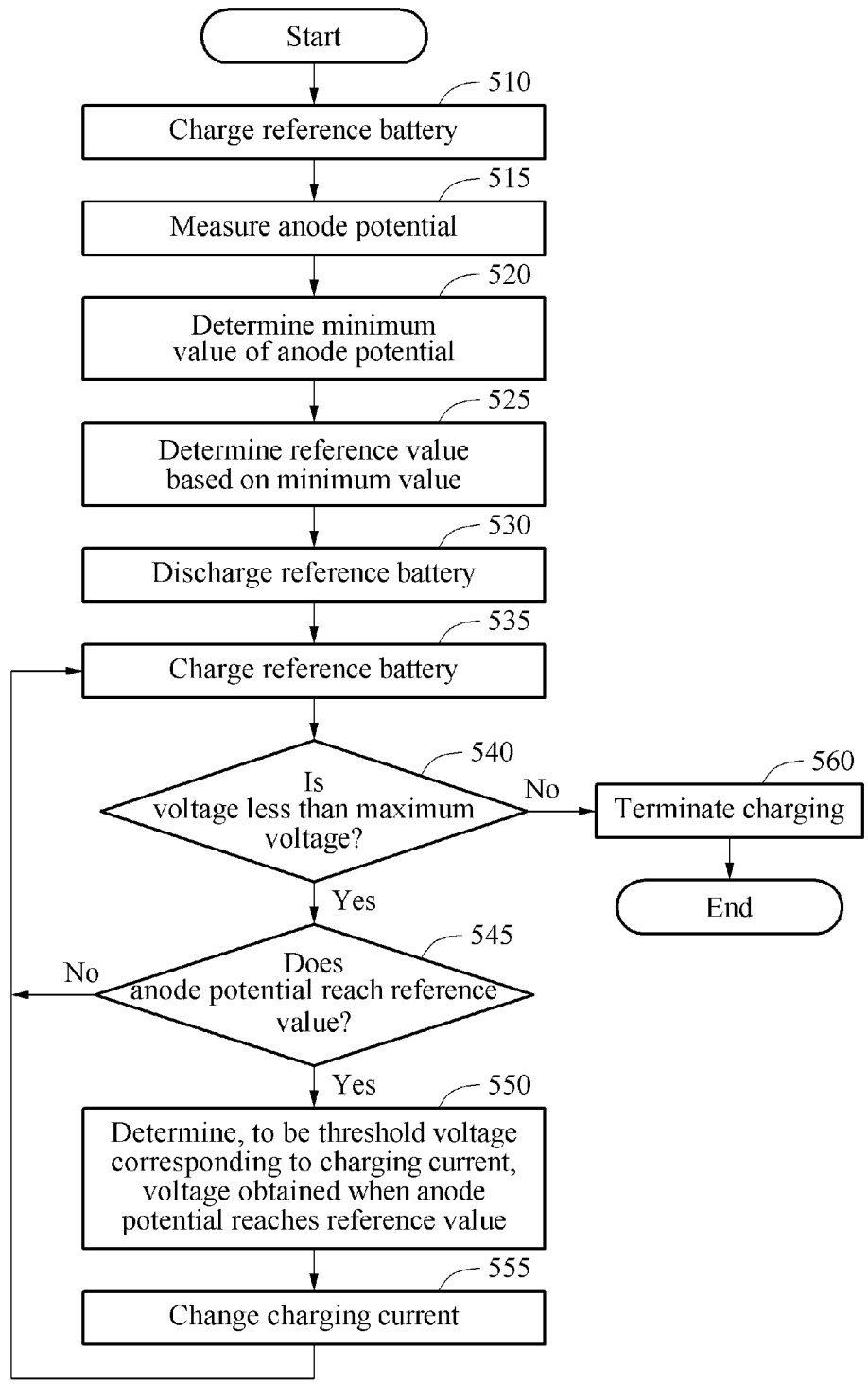
FIGS. 5 through 7, and 8A and 8B are diagrams illustrating examples of methods of determining a threshold voltage.
Figure 6:
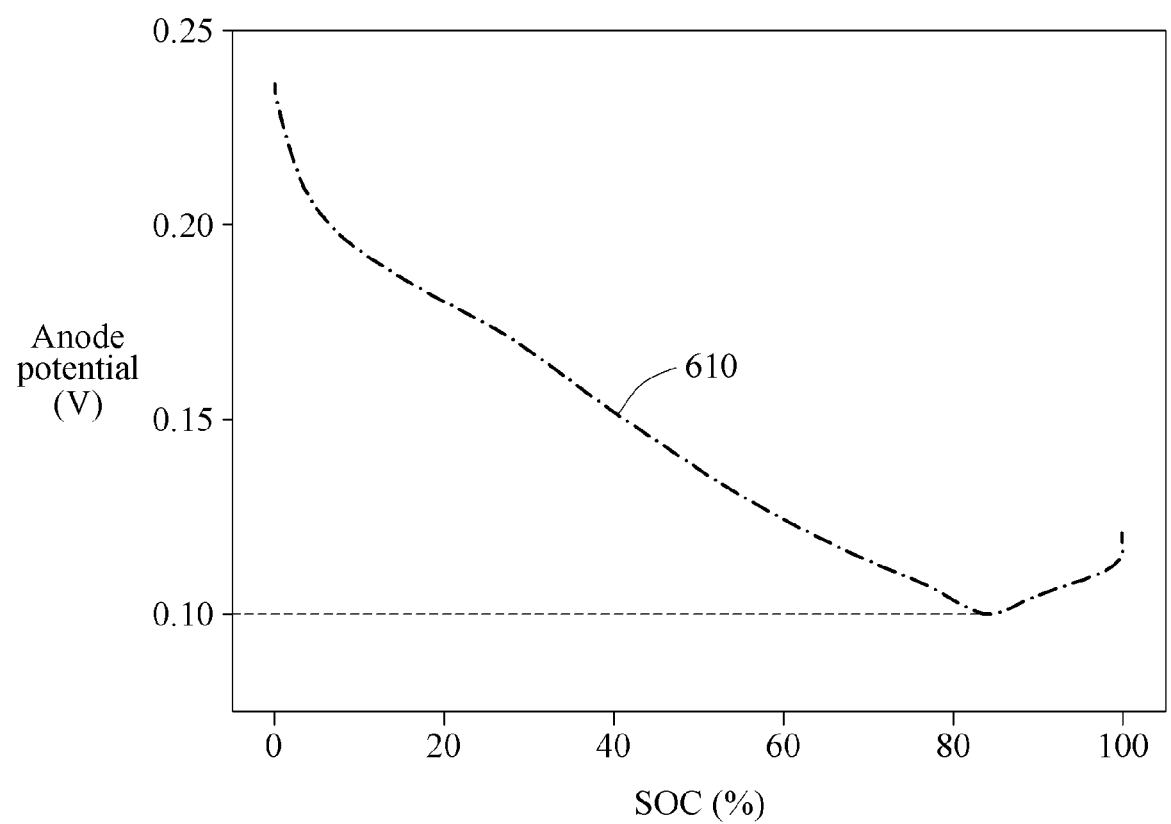

Referring to FIG. 5, in operation 510, the threshold voltage determining apparatus charges a reference battery in a normal charging mode. The normal charging mode is, for example, a constant current-constant voltage (CCCV) based charging mode in which a C-rate is 0.3. In such an example, the threshold voltage determining apparatus charges the reference battery with a constant current of 0.3 C-rate, and then charges the reference battery with a constant voltage when a state of charge (SOC) of the reference battery reaches a preset SOC, for example, 80%.

The reference battery used herein refers to a battery of a same type as the battery 120, in which a reference electrode is inserted.

In operation 515, the threshold voltage determining apparatus measures an anode potential of the reference battery being charged in the normal charging mode. The anode potential refers to a difference between a potential of an anode of the reference battery and a potential of the reference electrode. The threshold voltage determining apparatus measures the anode potential until the reference battery is fully charged.

In operation 520, the threshold voltage determining apparatus determines a minimum value of the anode potential of the reference battery based on a result of the measuring of the anode potential. In operation 525, the threshold voltage determining apparatus determines a reference value based on the minimum value. For example, referring to FIG. 6, the threshold voltage determining apparatus determines a minimum value of 0.1 V from an anode potential measuring result 610, and determines the minimum value of 0.1 V to be a reference value. Thus, in the example illustrated in FIG. 6, the reference value is 0.1.

The minimum value described in the foregoing is provided as an example, and thus may vary depending on a charging environment. For example, in a case in which a C-rate in the normal charging mode is 0.3, and a temperature of the anode is less than a room temperature, for example, when the temperature is −10° C., the minimum value of the anode potential is 0.075 V. In a case in which a C-rate in the normal charging mode is less than 0.3, and the temperature of the anode is greater than the room temperature, for example, when the temperature is 60° C., the minimum value of the anode potential is 0.73 V. In an example, when a C-rate in the normal charging mode increases at a same temperature of the anode, the minimum value of the anode potential decreases. Thus, based on the temperature of the anode and the C-rate in the normal charging mode, the minimum value of the anode potential is set to be 0.075 V to 0.73 V, for example. Also, based on the temperature of the anode being the room temperature and the C-rate being greater than 0.3, the minimum value of the anode potential is set to be 0.075 V to 0.2 V, for example. In addition, the minimum value of the anode potential varies depending on a type of the reference battery. For example, an electrode active material, a thickness of an electrode, a porosity of an electrode, an electrolyte, a current collector, a size of the reference battery, and/or a maximum voltage of the reference battery vary depending on a type of the reference battery, and such factors described in the foregoing description relate to the minimum value of the anode potential. Thus, the minimum value of the anode potential differs among types of the reference battery.

Referring to FIG. 5, in operation 530, when the reference value is determined, the threshold voltage determining apparatus discharges the reference battery. In this example, the threshold voltage determining apparatus fully discharges the reference battery.

In operation 535, the threshold voltage determining apparatus charges the discharged reference battery with a charging current in a step charging mode. For example, the threshold voltage determining apparatus charges the reference battery with a charging current of 1.2 C-rate in the step charging mode as described above.

In operation 540, the threshold voltage determining apparatus compares, to a maximum voltage, a voltage of the reference battery being charged with the charging current in the step charging mode.

In operation 545, in response to the voltage of the reference battery being less than the maximum voltage, the threshold voltage determining apparatus monitors whether the anode potential of the reference battery reaches the reference value.

In response to the anode potential of the reference battery not reaching the reference value as a result of the monitoring, the threshold voltage determining apparatus continues charging the reference battery with a charging current of 1.2 C-rate.

In operation 550, in response to the anode potential of the reference battery reaching the reference value as the result of the monitoring, the threshold voltage determining apparatus determines the voltage of the reference battery to be a threshold voltage corresponding to the charging current. In operation 555, the threshold voltage determining apparatus changes the charging current. The threshold voltage determining apparatus repeats operations 535 through 555, and then terminates charging the reference battery in operation 560 in response to the voltage of the reference battery being greater than or equal to the maximum voltage.

Figure 7:
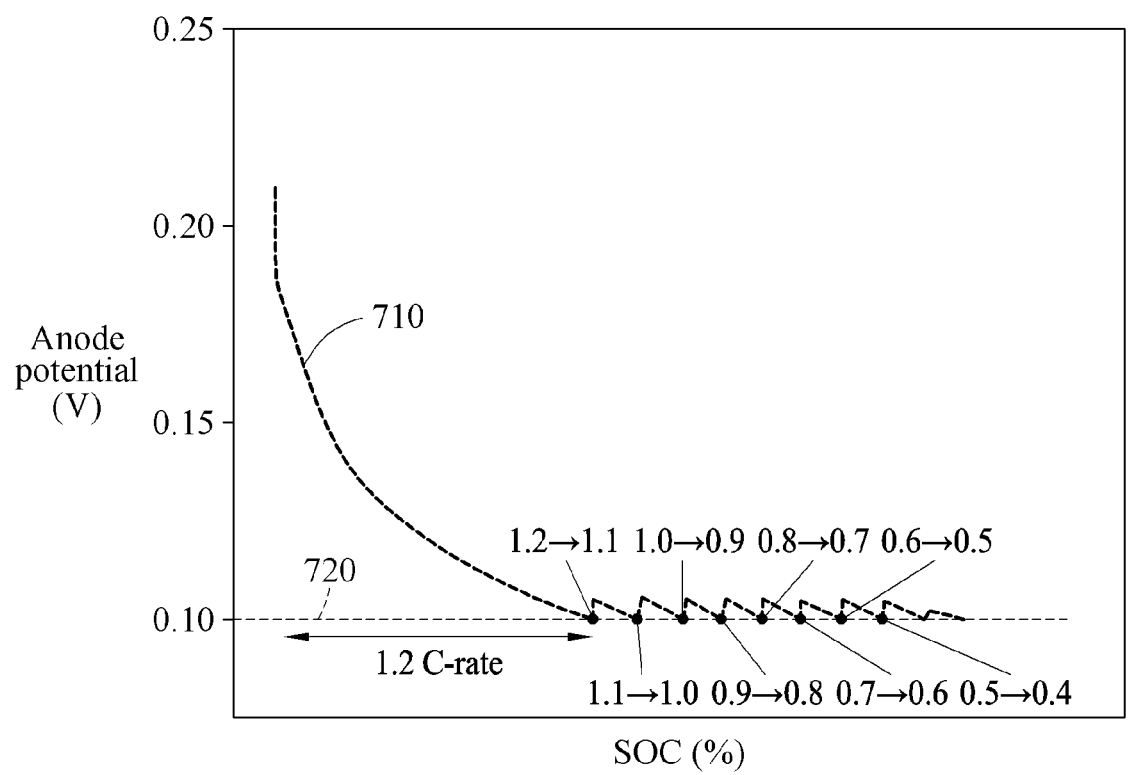

FIG. 7 illustrates a graph 710 indicating an anode potential based on a result of repetitively performing operations 535 through 555. In this example, it is assumed that a voltage of the reference battery is 3.974 V when the anode potential reaches a reference value 720 while the reference battery is being charged with a charging current of 1.2 C-rate. The threshold voltage determining apparatus determines 3.974 V to be a threshold voltage corresponding to 1.2 C-rate, and changes a charging current from 1.2 C-rate to 1.1 C-rate. When the anode potential of the reference battery reaches the reference value 720 while the reference battery is being charged with a charging current of 1.1 C-rate, the threshold voltage determining apparatus determines a voltage obtained when the anode potential reaches the reference value 720 to be a threshold voltage corresponding to 1.1 C-rate, and changes the charging current from 1.1 C-rate to 1.0 C-rate. The threshold voltage determining apparatus repeats operations 535 through 555 to determine a threshold voltage corresponding to each of charging currents in the step charging mode, and completes a table in which the charging currents and corresponding threshold voltages are recorded. The table is, for example, Table 2 illustrated above.

According to an example, a reference electrode is inserted in various types of batteries. In such a case, the threshold voltage determining apparatus performs the method of determining a threshold voltage, which is described with reference to FIG. 5, on the batteries in which the reference electrode is inserted and generates a table corresponding to a type of each of the batteries. The generated tables are, for example, the tables 440, 450, and 460 illustrated in FIG. 4B.

Referring back to FIG. 5, according to an example, the threshold voltage determining apparatus determines the reference value by adding a value $\alpha$ to the minimum value in operation 525. The value $\alpha$ is a constant value, which is greater than 0 and less than or equal to 0.1 ($0<\alpha\leq0.1$). In this example, a threshold voltage corresponding to a charging current is determined to be less than a threshold voltage obtained when the reference value is the minimum value, which will be described in detail with reference to FIGS. 8A and 8B.

Figure 8A:
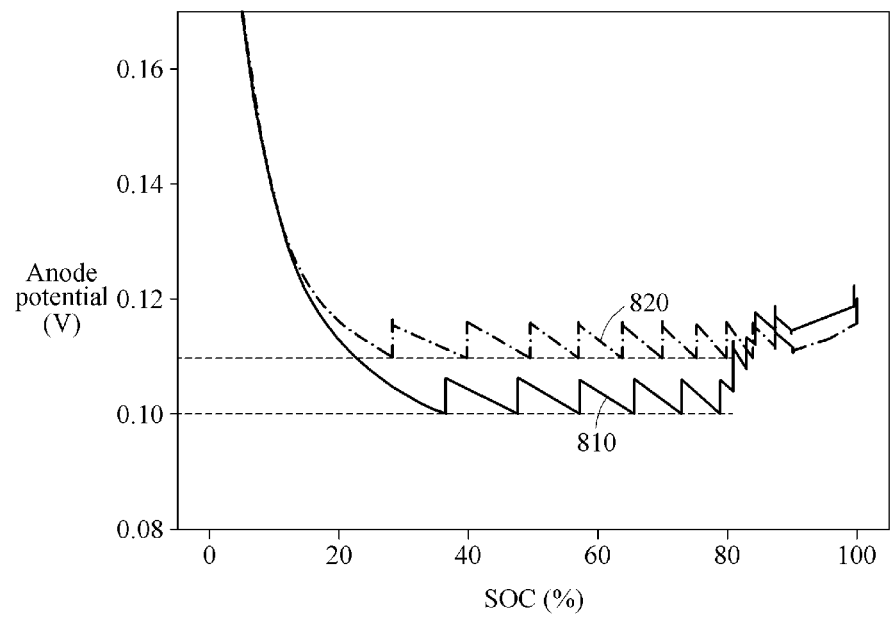

FIG. 8A illustrates a graph 810 indicating an anode potential based on a result of repetitively performing operations 535 through 555 when a reference value is 0.1, and a graph 820 indicating an anode potential based on the result of repetitively performing operations 535 through 555 when a reference value is 0.11. Table 3 illustrates numerical values associated with the graphs 810 and 820.

TABLE 3

|  | Reference value = 0.1 | Reference value = 0.11 |
| --- | --- | --- |
| SOC (%) obtained when an anode potential reaches a reference value, in a case of a charging current being 1.2 C-rate | 38 | 26 |
| SOC (%) obtained when an anode potential reaches a reference value, in a case of a charging current being 1.1 C-rate | 46 | 40 |
| SOC (%) obtained when an anode potential reaches a reference value, in a case of a charging current being 1.0 C-rate | 57 | 51 |
| SOC (%) obtained when an anode potential reaches a reference value, in a case of a charging current being 0.9 C-rate | 64 | 57 |
| SOC (%) obtained when an anode potential reaches a reference value, in a case of a charging current being 0.8 C-rate | 73 | 62 |
| SOC (%) obtained when an anode potential reaches a reference value, in a case of a charging current being 0.7 C-rate | 79 | 70 |
| . . . | . . . | . . . |

Figure 8B:
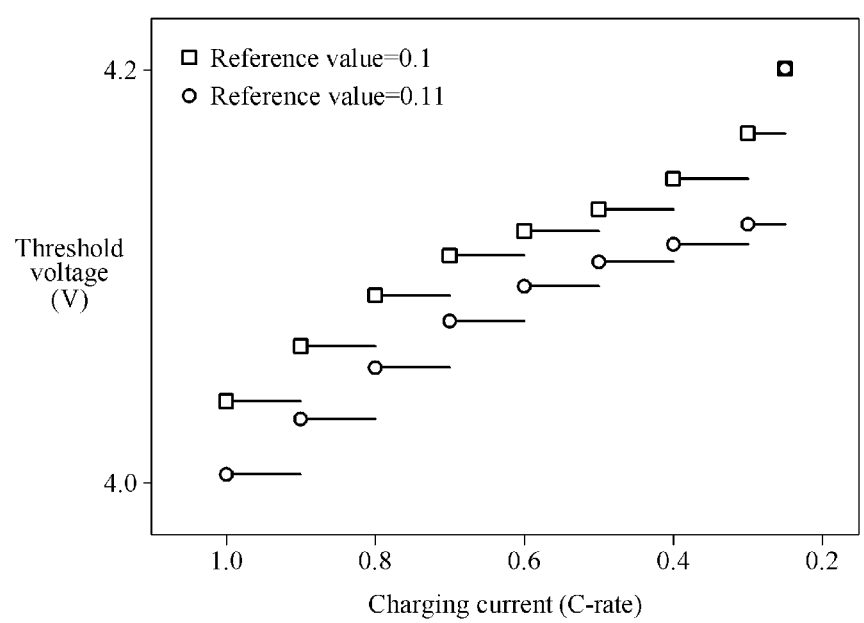

Referring to Table 3 above, in a situation in which a same charging current is given, an SOC obtained when the anode potential reaches the reference value of 0.11 is less than an SOC obtained when the anode potential reaches the reference value of 0.1. That is, when the same charging current flows in the reference battery, a voltage of the reference battery obtained when the anode potential reaches the reference value of 0.11 is less than a voltage of the reference battery obtained when the anode potential reaches the reference value of 0.1. A voltage of the reference battery obtained when the anode potential reaches a reference value is determined to be a threshold voltage, and thus the threshold voltage is determined to be lower in a case in which the reference value is 0.11, as shown in the graph 820, than in a case in which the reference value is 0.1, as shown in the graph 810. FIG. 8B illustrates threshold voltages as squares when the reference value is 0.1, and threshold voltages as circles when the reference value is 0.11. In this example, the threshold voltages obtained when the reference value is 0.11 are lower than the corresponding threshold voltages obtained when the reference value is 0.1.

For example, as illustrated, when the battery charging method described with reference to FIG. 2 is performed with a threshold voltage generated when the reference value is 0.11 as shown in the graph 820, a charging current changes when a voltage of the battery 120 reaches a low threshold voltage. Thus, the voltage of the battery 120 is controlled to be low, and thus a period of time during which the battery 120 is usable increases. Thus, by replacing a threshold voltage generated when the reference value is 0.1 with a threshold voltage generated when the reference value is 0.11, in Table 2 above, the battery charging method described with reference to FIG. 2 is performed.

Figure 9:
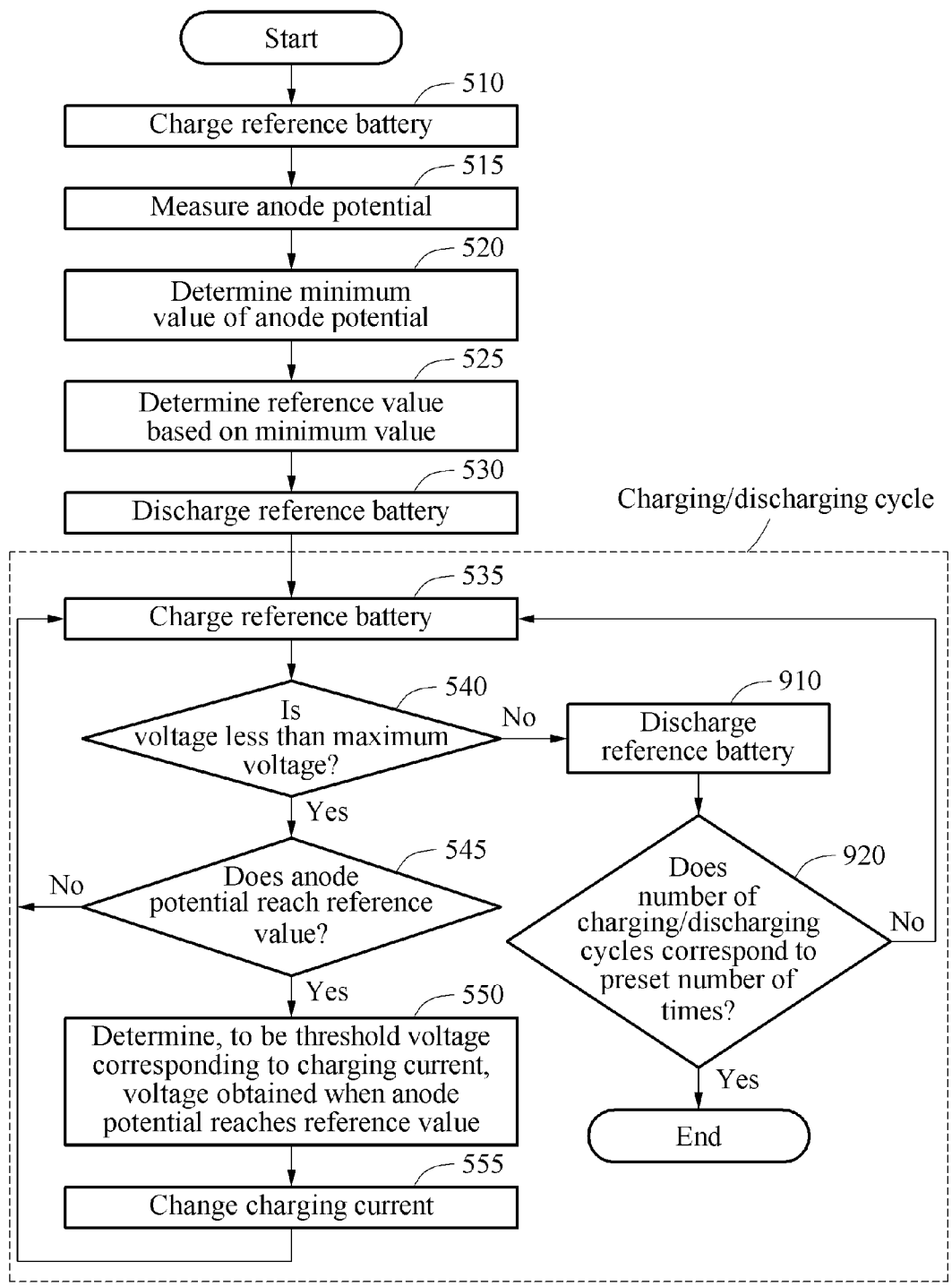
FIGS. 9 and 10 are diagrams illustrating another example of a method of determining a threshold voltage.
Figure 10:
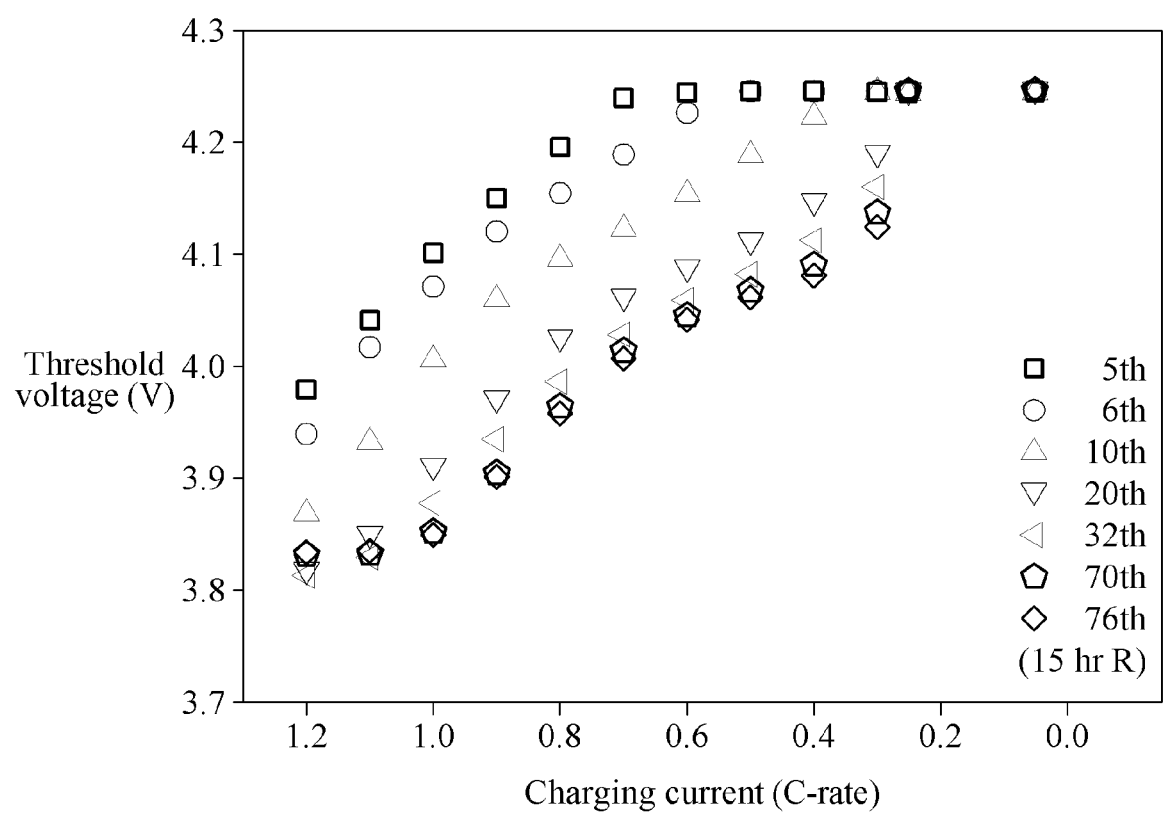

FIGS. 9 and 10 are diagrams illustrating another example of a method of determining a threshold voltage.

Referring to FIG. 9, in operation 910, when the voltage of the reference battery reaches the maximum voltage in operation 540 described with reference to FIG. 5, the threshold voltage determining apparatus discharges the reference battery. In this example, the reference voltage is fully discharged.

In operation 920, the threshold voltage determining apparatus verifies whether a number of charging and discharging cycles of the discharged reference battery corresponds to a preset number of times, for example, a number of 2 to 100 times. The threshold voltage determining apparatus performs operation 920 to verify whether the reference battery deteriorates to a preset degree of deterioration. In response to the number of charging and discharging cycles not corresponding to the preset number of times in operation 920, the threshold voltage determining apparatus repeats operations 535 through 555, and operations 910 and 920. That is, to deteriorate the reference battery to the preset degree of deterioration, the threshold voltage determining apparatus repeats operations 535 through 555, and operations 910 and 920. FIG. 10 illustrates a result of repeating operations 535 through 555, and operations 910 and 920. In detail, FIG. 10 illustrates a graph of a relationship between a charging current and a threshold voltage based on each of the charging and discharging cycles, for example, a fifth cycle, a sixth cycle, and a tenth cycle. In response to the number of charging and discharging cycles increasing, a threshold voltage is determined to be lower. As described above, when the charging of the battery 120 is controlled based on the threshold voltage being determined to be low, the period of time during which the battery 120 is usable increases.

In response to the number of charging and discharging cycles corresponding to the preset number of times in operation 920, the threshold voltage determining apparatus terminates the charging. For example, in a case in which the number of charging and discharging cycles corresponds to 76, the threshold voltage determining apparatus terminates the charging and generates a table indicating a relationship between a charging current and a threshold voltage associated with a 76th charging and discharging cycle. The generated table is stored in the battery charging apparatus 110.

According to an example, the threshold voltage determining apparatus generates a table in which charging currents and corresponding threshold voltages are recorded for each time of the charging and discharging cycles, and stores the generated table. That is, the threshold voltage determining apparatus generates such a table corresponding to an SOH that decreases in response to an increase in a number of charging and discharging cycles. The generated tables are, for example, the tables 410, 420, and 430.

Figure 11:
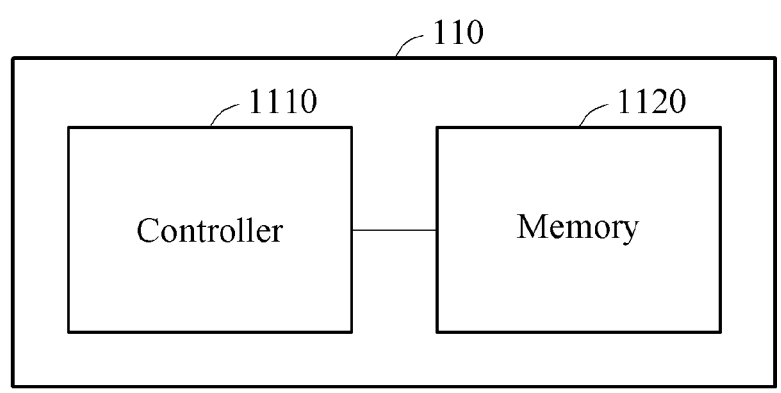
FIG. 11 is a diagram illustrating an example of a battery charging apparatus.

FIG. 11 is a diagram illustrating an example of the battery charging apparatus 110. Referring to FIG. 11, the battery charging apparatus 110 includes a controller 1110 and a memory 1120.

The controller 1110 charges the battery 120. For example, the controller 1110 charges the battery 120 with a charging current in a step charging mode.

In response to a current change event occurring while the battery 120 is being charged with the charging current, the controller 1110 changes the charging current to a subsequent charging current.

The memory 1120 stores a table in which charging currents and corresponding threshold voltages are recorded. The stored table is, for example, Table 1 described with reference to FIG. 2. According to an example, the memory 1120 stores the tables 410, 420, and 430 illustrated in FIG. 4A, and/or the tables 440, 450, and 460 illustrated in FIG. 4B.

The descriptions provided with reference to FIGS. 1 through 10 are applicable to FIG. 11, and thus will not be repeated here.

Figure 12:
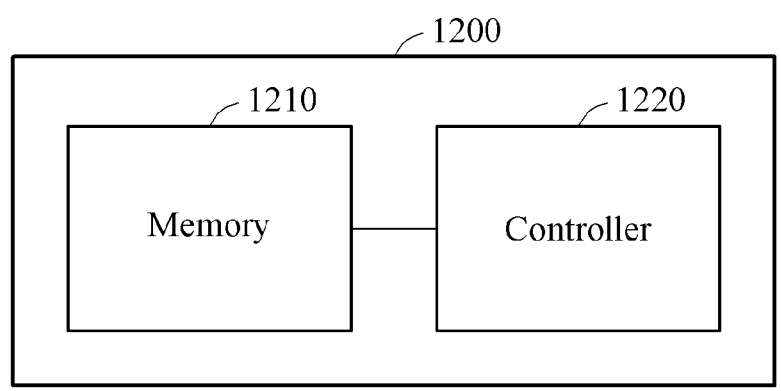
FIG. 12 is a diagram illustrating an example of a threshold voltage determining apparatus.

FIG. 12 is a diagram illustrating an example of a threshold voltage determining apparatus 1200. Referring to FIG. 12, the threshold voltage determining apparatus 1200 includes a memory 1210 and a controller 1220.

The controller 1220 charges a reference battery in a step charging mode. In response to an anode potential of the reference battery reaching a reference value while the reference battery is being charged in the step charging mode, the controller 1220 determines a voltage of the reference battery to be a threshold voltage corresponding to a charging current, and changes the charging current. The controller 1220 performs such an operation each time the anode potential of the reference battery reaches the reference value. Thus, the controller 1220 determines a threshold voltage corresponding to each of charging currents in the step charging mode, and generates a table in which the charging currents and corresponding threshold voltages are recorded.

The memory 1210 stores the table generated by the controller 1220. The table generated by the threshold voltage determining apparatus 1200 is stored in the battery charging apparatus 110 described above, or a battery management system (BMS) to be described hereinafter.

The descriptions provided with reference to FIGS. 1 through 11 are applicable to FIG. 12, and thus will not be repeated here.

Figure 13:
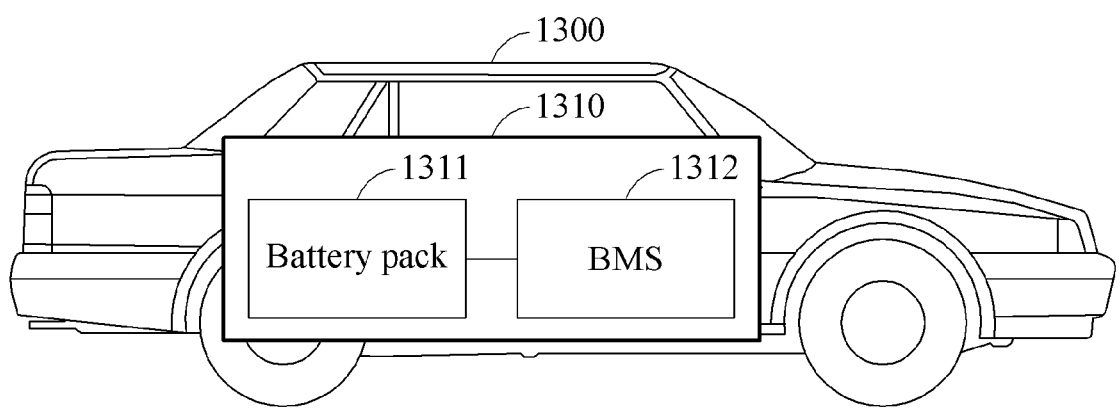
FIG. 13 is a diagram illustrating an example of a vehicle including a battery system.

FIG. 13 is a diagram illustrating an example of a vehicle 1300 including a battery system 1310. Referring to FIG. 13, the vehicle 1300 uses a battery pack 1311 as a power source. The vehicle 1300 is, for example, an electric vehicle or a hybrid vehicle.

The battery system 1310 includes the battery pack 1311 and a BMS 1312. The battery charging apparatus 110 described above may be an off-board charger that corresponds to an external charger of the vehicle 1300. In such a case, the battery charging apparatus 110 is connected to the vehicle 1300 through a cable to charge the battery pack 1311. According to an example, the battery charging apparatus 110 is an on-board charger included in the vehicle 1300 or the BMS 1312.

The battery charging apparatus 110 controls the charging of the battery pack 1311 such that an anode potential of a battery cell included in the battery pack 1311 is maintained to be greater than or equal to a reference value. Thus, a life of the battery pack 1311 may be increased.

The descriptions provided with reference to FIGS. 1 through 12 are applicable to FIG. 13, and thus will not be repeated here.

Figure 14:
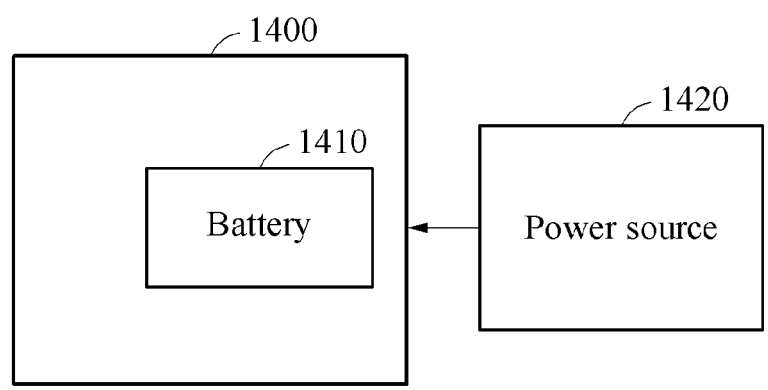
FIG. 14 is a diagram illustrating an example of a terminal.

FIG. 14 is a diagram illustrating an example of a terminal 1400. Referring to FIG. 14, the terminal 1400 is connected to a power source 1420.

The terminal 1400 may be a mobile terminal, such as, for example, a smartphone, a laptop computer, a tablet personal computer (PC), or a wearable device. However, the terminal 1400 is not limited to the foregoing examples.

In an example, the battery charging apparatus 110 described above is included in the terminal 1400. For example, the battery charging apparatus 110 is provided in the terminal 1400 in a form of an integrated circuit (IC), and the terminal 1400 performs the battery charging method described herein.

In another example, the battery charging apparatus 110 is included in the power source 1420. In such an example, the power source 1420 is connected to a charging port of the terminal 1400 through a wire or wirelessly. The power source 1420 operates in accordance with the battery charging method described herein to charge a battery 1410 of the terminal 1400.

Although the battery 1410 is illustrated as being included in the terminal 1400 in FIG. 14, such an illustration is provided merely as an example. For example, the battery 1410 may be separated from the terminal 1400 and connected to the power source 1420 to be charged.

The descriptions provided with reference to FIGS. 1 through 13 are applicable to FIG. 14, and thus will not be repeated.

According to an example, an anode potential of a battery corresponds to an internal state of the battery, and therefore may not be readily measured while the battery is being charged. Thus, the anode potential of the battery may be estimated, instead of being measured, during the charging. For such estimation, an electrochemical model may be used. However, the electrochemical model requires a high performance, and thus a low-performance BMS and/or mobile terminal may not readily run such an electrochemical model. The low-performance BMS and/or mobile terminal can thus perform the battery charging method described herein, instead of applying such an anode potential estimating method using the electrochemical model. Accordingly, the low-performance BMS and/or mobile terminal can maintain the anode potential of the battery to be greater than or equal to a preset value while the battery is being charged, thereby improving a life of the battery.

The controller 1110, the memory 1120, the memory 1210, the controller 1220, the battery system 1310, the BMS 1312, and the terminal 1400 in FIGS. 11-14 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2, 5, and 9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A battery charging method, comprising:
   charging a battery with a charging current; and
   changing the charging current in response to a current change event occurring during the charging of the battery,
   wherein the current change event occurs when the battery reaches a threshold voltage at which an anode potential of the battery reaches a reference value, the threshold voltage being set to maintain the anode potential to be greater than or equal to the reference value during the charging of the battery.

2. The battery charging method of claim 1, further comprising:
   verifying the threshold voltage corresponding to the charging current by referring to a table in which the threshold voltage and the charging current are stored.

3. The battery charging method of claim 2, further comprising:
   in response to life information of the battery changing, replacing the table with a table corresponding to the changed life information.

4. The battery charging method of claim 1, further comprising:
   terminating a charging interval corresponding to the charging current, in response to the current change event occurring; and
   charging the battery with a current that is less than the charging current in a subsequent charging interval.

5. The battery charging method of claim 1, further comprising:
   charging the battery with a constant voltage, in response to the battery reaching a maximum voltage; and
   terminating the charging of the battery, in response to the charging current decreasing to a termination current during the charging of the battery with the constant voltage.

6. The battery charging method of claim 1, wherein the reference value is 0.075 volts (V) to 0.73 V.

7. The battery charging method of claim 6, wherein the reference value is 0.075 V to 0.2 V.

8. A non-transitory computer-readable storage medium storing instructions that, when executed by a processor, cause the processor to perform the method of claim 1.

9. A battery charging apparatus, comprising:
   a controller configured to charge a battery with a charging current, and configured to change the charging current in response to a current change event occurring during the charging of the battery,
   wherein the current change event occurs when the battery reaches a threshold voltage at which an anode potential of the battery reaches a reference value, the threshold voltage being set to maintain the anode potential to be greater than or equal to the reference value during the charging of the battery.

10. The battery charging apparatus of claim 9, wherein the controller is further configured to verify the threshold voltage corresponding to the charging current by referring to a table in which the threshold voltage and the charging current are stored.

11. The battery charging apparatus of claim 9, wherein the controller is configured to replace the table, in response to life information of the battery changing, with a table corresponding to the changed life information.

12. The battery charging apparatus of claim 9, wherein the controller is configured to terminate a charging interval corresponding to the charging current and to charge the battery with a current that is less than the charging current in a subsequent charging interval, in response to the current change event occurring.

13. The battery charging apparatus of claim 9, wherein the controller is configured to charge the battery with a constant voltage in response to the battery reaching a maximum voltage, and to terminate the charging of the battery in response to the charging current decreasing to a termination current during the charging of the battery with the constant voltage.

14. The battery charging apparatus of claim 9, wherein the reference value is 0.075 volts (V) to 0.73 V.

15. The battery charging apparatus of claim 14, wherein the reference value is 0.075 V to 0.2 V.

16. A battery charging method, comprising:
    charging a battery with a first charging current; and
    charging the battery with a second charging current that is less than the first charging current, in response to the battery reaching a threshold voltage at which an anode potential of the battery reaches a reference value,
    wherein the threshold voltage is set to maintain the anode potential to be greater than or equal to the reference value during the charging of the battery.

17. The battery charging method of claim 16, wherein the reference value is 0.075 volts (V) to 0.73 V.

18. The battery charging method of claim 17, wherein the reference value is 0.075 V to 0.2 V.

19. The battery charging method of claim 16, wherein the first charging current is greater than or equal to 1.0 C-rate.

20. The battery charging method of claim 16, further comprising:
    verifying the threshold voltage corresponding to the first charging current by referring to a table in which the threshold voltage and the first charging current are stored.

21. The battery charging method of claim 20, further comprising:
    in response to life information of the battery changing, replacing the table with a table corresponding to the changed life information.

22. The battery charging method of claim 16, further comprising:
    charging the battery with a constant voltage, in response to the battery reaching a maximum voltage; and
    terminating the charging of the battery, in response to a charging current decreasing to a termination current during the charging of the battery with the constant voltage.

23. A battery system, comprising:
    a battery; and
    a controller configured to
        charge the battery, in a first charging mode, with an initial charging current among charging currents stored in a memory, and
        in the first charging mode, change the initial charging current to a subsequent charging current, among the charging currents, in response to a voltage of the battery reaching a threshold voltage stored in the memory as corresponding to the initial charging current, wherein the threshold voltage comprises a voltage at which an anode potential of the battery reaches a reference value, and wherein the threshold voltage is set to maintain the anode potential to be greater than or equal to the reference value during the charging of the battery.

24. The battery system of claim 23, wherein the controller is further configured to terminate the charging of the battery in the first charging mode and to charge the battery with a constant voltage in a second charging mode, in response to the voltage of the battery reaching a maximum voltage.

25. The battery system of claim 24, wherein the controller is further configured to terminate the charging of the battery in the second charging mode, in response to a charging current in the second charging mode decreasing to a termination current.

* * * * *

UNITED STATES PATENT AND TRADEMARK OFFICE
CERTIFICATE OF CORRECTION

PATENT NO. : 10,985,590 B2
APPLICATION NO. : 15/782452
DATED : April 20, 2021
INVENTOR(S) : Ju Wan Lim, Jin Duk Oh and Myunghoon Kim It is certified that error appears in the above-identified patent and that said Letters Patent is hereby corrected as shown below:

On the Title Page

Item (72) Inventors Replace "Jin Duk Oh, Seoul (KR)" with "Duk Jin OH', Seoul (KR)"

Signed and Sealed this
Twenty-second Day of November, 2022

Katherine Kelly Vidal
Director of the United States Patent and Trademark Office